(12) United States Patent
Slapak

(10) Patent No.: US 9,151,361 B2
(45) Date of Patent: Oct. 6, 2015

(54) GEARBOX ARRANGEMENT WHICH COMPRISES A FIRST GEARBOX WITH AN ADJOINING RANGE GEARBOX

(75) Inventor: Dieter Slapak, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 13/638,818

(22) PCT Filed: Mar. 22, 2011

(86) PCT No.: PCT/SE2011/050309
§ 371 (c)(1),
(2), (4) Date: Oct. 10, 2012

(87) PCT Pub. No.: WO2011/123019
PCT Pub. Date: Oct. 6, 2011

(65) Prior Publication Data
US 2013/0053204 A1 Feb. 28, 2013

(30) Foreign Application Priority Data
Apr. 1, 2010 (SE) ...................................... 1050324

(51) Int. Cl.
*F16H 3/093* (2006.01)
*F16H 3/00* (2006.01)
*F16H 37/04* (2006.01)

(52) U.S. Cl.
CPC .............. *F16H 3/006* (2013.01); *F16H 37/046* (2013.01); *F16H 2200/0065* (2013.01); *F16H 2200/0095* (2013.01); *Y10T 74/19219* (2015.01); *Y10T 74/19233* (2015.01)

(58) Field of Classification Search
None
See application file for complete search history.

(56) References Cited

U.S. PATENT DOCUMENTS

| | | | | |
|---|---|---|---|---|
| 3,589,483 | A | * 6/1971 | Smith | 192/3.52 |
| 4,478,106 | A | 10/1984 | Schreiner | |
| 7,083,540 | B2 | * 8/2006 | Janson et al. | 475/211 |
| 2005/0204841 | A1 | 9/2005 | Baldwin et al. | |

(Continued)

FOREIGN PATENT DOCUMENTS

| | | |
|---|---|---|
| DE | 40 00 832 C1 | 2/1991 |
| DE | 199 23 185 A1 | 12/2000 |

(Continued)

OTHER PUBLICATIONS

International Search Report dated May 5, 2011 issued in corresponding international patent application No. PCT/SE2011/050309.

(Continued)

*Primary Examiner* — Erin D Bishop
(74) *Attorney, Agent, or Firm* — Ostrolenk Faber LLP

(57) ABSTRACT

A gearbox arrangement including a dual-clutch gearbox and an adjoining range gearbox. The dual-clutch gearbox comprises an extra motion-transmitting connection adapted to transmit rotary motion from a primary gear to the output shaft without use of the range gearbox, so that the gearbox arrangement provides an extra gear of at least one primary gear. The extra gear is so dimensioned that it has a higher transmission ratio than the gear achieved by the primary gear with a low transmission ratio in the range gearbox, and a lower transmission ratio than the gear achieved by the primary gear with a high transmission ratio in the range gearbox.

12 Claims, 2 Drawing Sheets

(56) References Cited

U.S. PATENT DOCUMENTS

2008/0134834 A1 6/2008 Gitt et al.
2009/0272211 A1 11/2009 Hoffmann et al.
2009/0280955 A1 11/2009 Dittrich et al.

FOREIGN PATENT DOCUMENTS

| EP | 2 149 725 A2 | 2/2010 |
| WO | WO 2007/039021 A1 | 4/2007 |
| WO | WO 2007/045333 A1 | 4/2007 |

OTHER PUBLICATIONS

International Preliminary Report on Patentability dated Feb. 21, 2012 issued in corresponding international patent application No. PCT/SE2011/050309.
European Search Report mailed Sep. 9, 2013 in counterpart European Application No. 11 76 3132.5.

* cited by examiner

| Gear | Input shaft | Primary gear | Countershaft | Spur gear |
|---|---|---|---|---|
| 20 | $a_2$ | IV | $s_1$ | $H_3$ |
| 19 | $a_1$ | III | $s_1$ | $H_3$ |
| 18 | $a_2$ | II | $s_1$ | $H_3$ |
| 17 | $a_1$ | I | $s_1$ | $H_3$ |
| 16 | $a_2$ | VIII | $s_2$ | $H_2$ |
| 15 | $a_1$ | VII | $s_2$ | $H_2$ |
| 14 | $a_2$ | VI | $s_2$ | $H_2$ |
| 13 | $a_1$ | V | $s_2$ | $H_2$ |
| 12 | $a_2$ | IV | $s_1$ | $H_1$ |
| 11 | $a_1$ | III | $s_1$ | $H_1$ |
| 10 | $a_2$ | II | $s_1$ | $H_1$ |
| 9 | $a_1$ | I | $s_1$ | $H_1$ |
| 8 | $a_2$ | VIII | $s_2$ | $L_2$ |
| 7 | $a_1$ | VII | $s_2$ | $L_2$ |
| 6 | $a_2$ | VI | $s_2$ | $L_2$ |
| 5 | $a_1$ | V | $s_2$ | $L_2$ |
| 4 | $a_2$ | IV | $s_1$ | $L_1$ |
| 3 | $a_1$ | III | $s_1$ | $L_1$ |
| 2 | $a_2$ | II | $s_1$ | $L_1$ |
| 1 | $a_1$ | I | $s_1$ | $L_1$ |
| R4 | $a_2$ | VIII | $s_2$ | R |
| R3 | $a_1$ | VII | $s_2$ | R |
| R2 | $a_2$ | VI | $s_2$ | R |
| R1 | $a_1$ | V | $s_2$ | R |

Fig 2

GEARBOX ARRANGEMENT WHICH COMPRISES A FIRST GEARBOX WITH AN ADJOINING RANGE GEARBOX

CROSS REFERENCE TO RELATED APPLICATIONS

The present application is a 35 U.S.C. §371 National Phase conversion of PCT/SE2011/050309, filed Mar. 22, 2011, which claims benefit of Swedish Application No. 1050324-1, filed Apr. 1, 2010, the disclosure of which is incorporated herein by reference. The PCT International Application was published in the English language.

BACKGROUND TO THE INVENTION AND PRIOR ART

The invention relates to a gearbox arrangement which comprises a first gearbox with an adjoining range gearbox.

The first gearbox is with advantage a dual-clutch gearbox. A dual-clutch gearbox comprises a first set of components substantially corresponding to the components in a first mechanical gearbox, and a second set of components substantially corresponding to the components in a second mechanical gearbox. The first set of components cover all the odd-numbered gears in the dual-clutch gearbox and the second set of components cover all the even-numbered gears. Switching between the two sets of components involves using clutch devices which make it possible to engage and disengage the respective sets of components. The fact that the two sets of components are used alternately makes it possible to effect stepped upward and downward gear changes in a dual-clutch gearbox without torque interrupt.

Many heavy vehicles often have a first gearbox connected by a first motion-transmitting connection to a so-called range gearbox. A range gearbox usually comprises a planetary gear which can provide each primary gear in the first gearbox with respective high and low transmission ratios. To operate the range gearbox, a driver can move an operating means, which may be fastened around a gear lever in the driving cab, to a position which indicates a desired gear position of the range gearbox. The driver moving the operating means to a desired position usually results in activation of an operating cylinder which is controlled by compressed air and which moves a ring gear of the range gearbox between the respective high and low transmission ratio positions. Alternatively, the gear change may be indicated by an automatic system. As the ring gear is connected in the low transmission ratio position to a stationary clutch cone and in the high transmission ratio position to a clutch cone on a rotating shaft, there has to be a torque interrupt during a gear change process in the range gearbox in order to synchronise the speed of the ring gear before it can be moved between the two positions.

SUMMARY OF THE INVENTION

The object of the present invention is to propose a gearbox arrangement which comprises a first gearbox with an adjoining range gearbox whereby gear changes can be effected without torque interrupt in at least the range gearbox.

This object is achieved with the gearbox of the kind disclosed in this application. Changing gear between a low transmission ratio and a high transmission ratio in a range gearbox requires the provision of a torque interrupt in the range gearbox. According to the present invention, the first gearbox comprises a second motion-transmitting connection which can transmit motion from at least one primary gear in the first gearbox to the output shaft without using the range gearbox. The primary gear in the first gearbox can thus provide an extra transmission ratio and the gearbox arrangement an extra gear. The extra gear is so dimensioned that it has a higher transmission ratio than the gear provided by the primary gear with a low transmission ratio in the range gearbox, and a lower transmission ratio than the primary gear with a high transmission ratio in the range gearbox. The extra gear thus becomes an intermediate gear during stepped upshifts and downshifts. Such an intermediate gear obviates the need for the range gearbox to switch directly between a low transmission ratio and a high transmission ratio. When the extra gear is activated, there is no load upon the range gearbox. In this unloaded state, the clutch element of the range gearbox can be moved to a desired position. When a gear change is to be made from this extra gear to a gear with high or low transmission ratio in the range gearbox, the clutch element can be moved beforehand to the desired position. The gear change process in the range gearbox can thus take place without torque interrupt. The first gearbox usually comprises several primary gears. Creating an extra gear for one or more of the primary gears in the first gearbox and giving them a suitable transmission ratio makes it possible to prevent a low transmission ratio in the range gearbox from being adjacent to a gear with a high transmission ratio in the range gearbox during a stepped upshift or downshift.

According to an embodiment of the present invention, the first gearbox comprises several gears each connectable to respective low and high transmission ratios of the range gearbox, and the gears are so dimensioned that all gears which have a low transmission ratio in the range gearbox have a lower transmission ratio than all gears which have a high transmission ratio in the range gearbox. In this case, gear changing in the range gearbox is only necessary between the highest gear which has a low transmission ratio in the range gearbox and the lowest gear which has a high transmission ratio in the range gearbox. In this case, creating an extra gear which has a transmission ratio between said gears is sufficient to prevent a gear with a low transmission ratio in the range gearbox from being directly adjacent to a gear with a high transmission ratio in the range gearbox. It is possible, however, that one or more gears which have a low transmission ratio in the range gearbox may have a higher transmission ratio than one or more gears which have a high transmission ratio in the range gearbox. In this case, it is necessary to create several extra intermediate gears to prevent a gear with a low transmission ratio in the range gearbox from being adjacent to a gear with a high transmission ratio in the range gearbox.

According to a preferred embodiment of the present invention, the first gearbox comprises several primary gears which are connectable to the extra motion-transmitting connection so that several extra gears are created, comprising at least two extra gears so dimensioned that they have a transmission ratio between a gear which has a low transmission ratio in the range gearbox and a gear which has a high transmission ratio in the range gearbox. Several extra intermediate gears are thus created to separate a gear with a low transmission ratio from a gear with a high transmission ratio in the range gearbox. This results in further time for gear change preparation in the range gearbox during a stepped gear change.

According to a preferred embodiment of the present invention, the range gearbox comprises a planetary gear with a clutch element which is movable between a low transmission ratio position and a high transmission ratio position. Such a clutch element may be a ring gear. In the low transmission ratio position the ring gear is usually coupled with a stationary clutch cone, and in the high transmission ratio position the ring gear is usually coupled with a clutch cone on a rotating shaft. For the ring gear to move between the two clutch positions, it has to be rotating at the same speed as the respective clutch cones. Such a synchronising process for the speed of the ring gear requires the provision of a torque interrupt in the range gearbox. According to the present invention, no torque interrupt need be provided in the gearbox arrangement when an extra gear is used as an intermediate gear while the ring gear is moved between the two clutch positions. The clutch element need not be a ring gear but may be a clutch element with substantially with any desired but functional configuration.

According to a preferred embodiment of the present invention, the extra motion-transmitting connection comprises an element which extends through the range gearbox to the output shaft. The range gearbox usually comprises a planetary gear comprising a sun wheel, planet wheels and a planet wheel carrier. A planet wheel carrier is usually provided with apertures. Such an element may therefore extend through at least one of the carrier's apertures and transmit torque to the output shaft. Alternatively, the extra motion-transmitting connection may have an element which has an extent beside the planetary gear and the range gearbox to the output shaft.

According to a preferred embodiment of the present invention, the first gearbox is a dual-clutch gearbox. Dual-clutch gearboxes comprise substantially two gearboxes connected in parallel which are used alternately during a stepped upshift or downshift. Alternating between the two parallel gearboxes makes possible a gear change process without torque interrupt. A gearbox arrangement which comprises a dual-clutch gearbox with an adjoining range gearbox according to the present invention may thus be used for stepped upshifts and downshifts entirely without torque interrupt. The dual-clutch gearbox may comprise a first input shaft engageable by means of a first clutch device, and a second input shaft engageable by means of a second clutch device. Such clutch devices and input shafts make it possible to engage and disengage quickly the two gearboxes connected in parallel.

According to an embodiment of the invention, the gearbox arrangement is so configured that a stepped gear change between two adjacent gears always involves the clutch devices effecting alternate engagement of said input shafts. This provides assurance that every step of the gear change can take place without torque interrupt. The dual-clutch gearbox comprises with advantage a first countershaft, a second countershaft, at least one primary gear which connects the first input shaft to the first countershaft, at least one primary gear which connects the first input shaft to the second countershaft, at least one primary gear which connects the second input shaft to the first countershaft, and at least one primary gear which connects the second input shaft to the second countershaft. The number of primary gears will in this case be at least four.

According to another embodiment of the invention, the dual-clutch gearbox comprises a mainshaft which is connected to the range gearbox, at least one gear which connects the first countershaft to the mainshaft and at least one gear which connects the second countershaft to the mainshaft. Said gears make it possible for the first countershaft and the second countershaft to be alternately connected to the mainshaft and consequently to the range gearbox.

BRIEF DESCRIPTION OF THE DRAWINGS

Preferred embodiments of the invention are described below by way of examples with reference to the attached drawings, in which:

FIG. 1 depicts a gearbox arrangement according to an embodiment of the present invention and FIG. 2 shows the gears achieved with the gearbox arrangement in FIG. 1.

DETAILED DESCRIPTION OF A PREFERRED EMBODIMENT OF THE INVENTION

Figure 1:
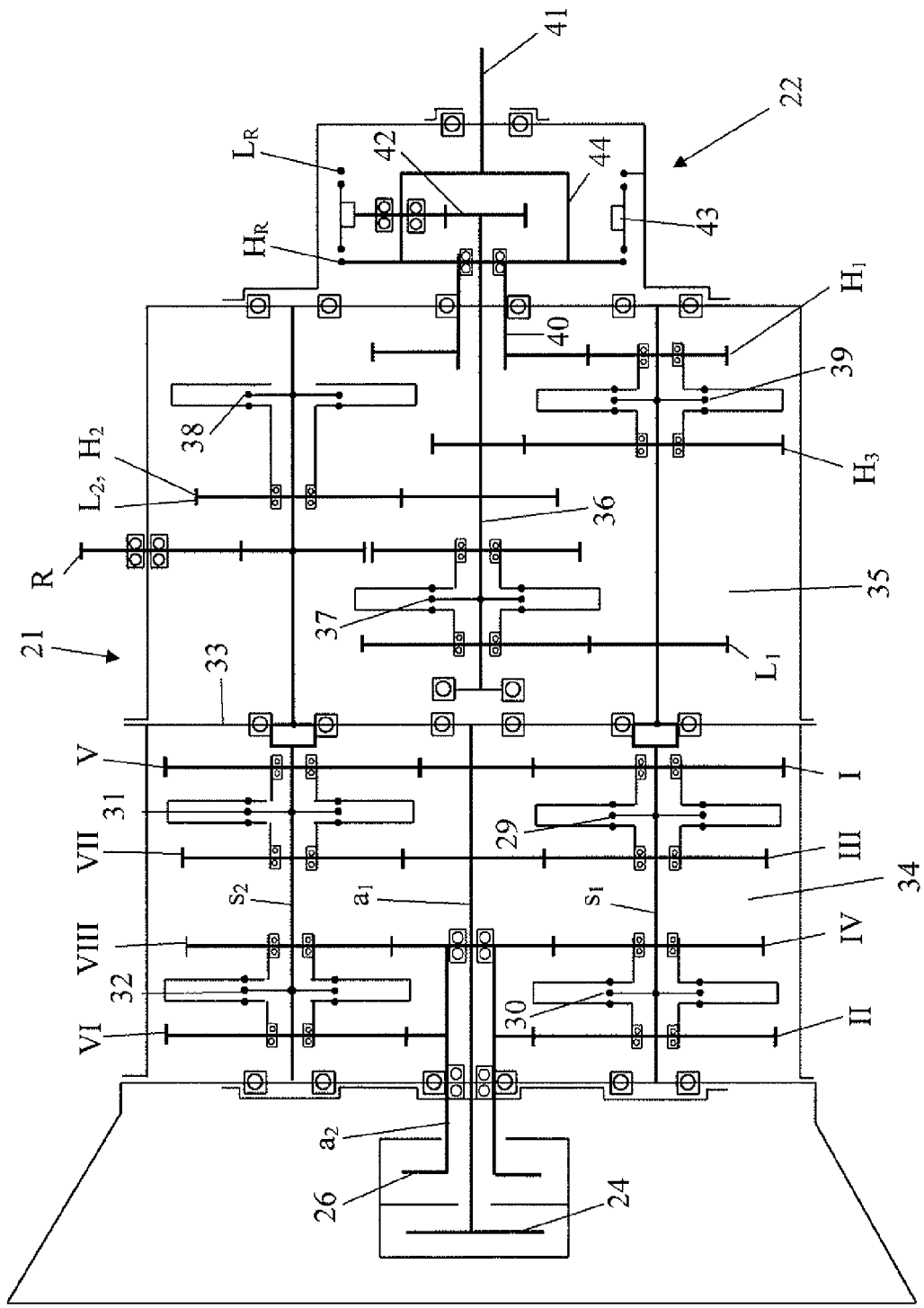

FIG. 1 depicts a gearbox arrangement according to an embodiment of the present invention. The gearbox arrangement has in this embodiment twenty gears 1-20 to propel the vehicle forwards and four gears R1-R4 to propel the vehicle rearwards. The gearbox arrangement comprises a dual-clutch gearbox 21 and an adjoining range gearbox 22. The dual-clutch gearbox 21 comprises a first input shaft $a_1$ and a second input shaft $a_2$ which is disposed around the first input shaft $a_1$. The first input shaft $a_1$ is engageable and disengageable by means of a first clutch device 24, and the second input shaft $a_2$ is engageable and disengageable by means of a second clutch device 26. The input shafts $a_1$, $a_2$ are connectable alternately to an undepicted driveshaft of an engine. The input shafts $a_1$, $a_2$ extend into the dual-clutch gearbox 21 in which they are connectable alternately to a first countershaft $s_1$ and a second countershaft $s_2$. The alternate connections between the input shafts $a_1$, $a_2$ and the countershafts $s_1$, $s_2$ are effected by means of eight primary spur gears I-VIII which have a varying transmission ratio. The spur gears I-VIII are engaged by means of synchronising clutches 29-32. A first such synchronising clutch 29 is adapted to connecting the first input shaft $a_1$ to the first countershaft $s_1$ by means of two primary spur gears I, III. A second synchronising clutch 30 is adapted to connecting the second input shaft $a_2$ to the first countershaft $s_1$ by means of two primary spur gears II, IV. A third synchronising clutch 31 is adapted to connecting the first input shaft $a_1$ to the second countershaft $s_2$ by means of two primary spur gears V, VII. A fourth such synchronising clutch 32 is adapted to connecting the second input shaft $a_2$ to the second countershaft $s_2$ by means of two spur gears VI, VIII.

The dual-clutch gearbox 21 comprises a wall element 33 which divides the gearbox into a first space 34 substantially comprising the abovementioned components and a second space 35. The two countershafts $s_1$, $s_2$ extend from the first space 34 into the second space 35 through apertures in the wall element 33. The first countershaft $s_1$ and the second countershaft $s_2$ comprise in the second space 35 a further number of tertiary spur gears which are connectable to a mainshaft 36. The first countershaft $s_1$ comprises two tertiary spur gears $L_1$, $H_3$ by which the first countershaft $s_1$ can be connected to the mainshaft 36. The second countershaft $s_2$ comprises likewise two tertiary spur gears R, $H_2$, $L_2$ by which the second countershaft $s_2$ can be connected to the mainshaft 36. A fifth synchronising clutch 37 is adapted to connecting the first countershaft $s_1$ to the mainshaft 36 by means of tertiary spur gear $L_1$. The fifth synchronising clutch 37 is alternatively adapted to connecting the second countershaft $s_2$ to the mainshaft 36 by means of tertiary spur gear R. Spur Tertiary spur gear R effects rotation of the mainshaft 36 in an opposite direction and is therefore used for reverse gears. A sixth synchronising clutch 38 is adapted to connecting the second countershaft $s_2$ to the mainshaft 36 by means of tertiary spur gear $L_2$, $H_2$. The tertiary spur gear transmission $L_2$, $H_2$ has here two designations, since it is used both when the range gearbox 22 has a high transmission ratio and a low transmission ratio. A seventh synchronising clutch 39 is adapted to connecting the first countershaft $s_1$ to the mainshaft 36 by means of tertiary spur gear $H_3$. The seventh synchronising clutch 39 is also adapted to connecting the first countershaft $s_1$ to an extra shaft 40 by means of a secondary spur gear $H_1$.

The mainshaft 36 of the dual-clutch gearbox is connected via the range gearbox 22 to an output shaft 41 of the gearbox arrangement. Therefore, a first motion-transmitting connection between one of the primary spur gearwheels on one of the input shafts $a_1$, $a_2$ and the range gearbox 22 includes one of the primary spur gearwheels on one of the countershafts $s_1$, $s_2$ operating together with the one of the primary spur gearwheels on one of the input shafts $a_1$, $a_2$, one of the countershafts $s_1$, $s_2$, one of the tertiary spur gearwheels on one of the countershafts $s_1$, $s_2$, one of the tertiary spur gearwheels on the mainshaft operating together with the one of the tertiary spur gearwheels on one of the countershafts $s_1$, $s_2$, and the mainshaft 36. The range gearbox 22 comprises a planetary gear 42 comprising in a conventional way a sun wheel, a number of planet wheels and a planet wheel carrier. Changing gear in the range gearbox 22 involves a clutch element in the form of a ring gear 43 being moved between a position $L_R$ which results in a low transmission ratio in the range gearbox 22 and a position $H_R$ which results in a high transmission ratio in the range gearbox 22. When the ring gear 43 is moved to the low transmission ratio position $L_R$ in FIG. 1, it is connected to a stationary clutch cone. In a position of connection to the stationary clutch cone, the ring gear 43 is motionless. In this case the motion of the mainshaft 36 is transmitted to the output shaft 41 via the sun wheel, the planet wheels and the planet wheel carrier. The rotation speed of the mainshaft 36 is here transmitted to the output shaft 41 with a downshift. The range gearbox 22 provides in this case a low transmission ratio. When the ring gear 43 is moved to the high transmission ratio position $H_R$ in FIG. 1, it connects a clutch cone of the mainshaft 36 to the planet wheels. In this case the motion of the mainshaft 36 is transmitted to the output shaft 41 via the clutch cone, the ring gear, the planet wheels and the planet wheel carrier. The whole planetary gear together with the ring gear 43 here rotate as a unit so that the rotation speed of the mainshaft 36 is transmitted unchanged to the output shaft 41. The range gearbox 22 provides in this case a high transmission ratio. The primary gears achievable in the dual-clutch gearbox 21 can thus provide a low transmission ratio or a high transmission ratio in the range gearbox 22. The range gearbox 22 provides the gearbox arrangement with twice as many gears as the dual-clutch gearbox.

As previously stated, the seventh synchronising clutch 39 is also adapted to connecting the first countershaft $s_1$ to the extra shaft 40 by means of a secondary spur gear $H_1$. The extra shaft 40 is rigidly connected to the output shaft 41 via a schematically depicted connecting element 44. The connecting element 44 extends in this case through at least one aperture of the planet wheel carrier. The extra shaft 40 therefore rotates always at the same speed as the output shaft 41. The transmission ratio provided by means of the extra shaft 40 and the connecting element 44 therefore corresponds to when the high transmission ratio in the range gearbox 22 is used. For this reason the secondary spur gear connected to the extra shaft 40 is designated $H_1$. Therefore, a second motion-transmitting connection between one of the primary spur gearwheels on one of the input shafts $a_1$, $a_2$ and the output shaft 41 includes one of the primary spur gearwheels I-IV on the first countershaft $s_1$ operating together with the one of the primary spur gearwheels on one of the input shafts $a_1$, $a_2$, the first countershaft $s_1$, a first secondary spur gearwheel of the secondary spur gear $H_1$ on the first countershaft $s_1$, a second secondary spur gearwheel of the secondary spur gear $H_1$ on the extra shaft 40, the extra shaft 40, and the connecting element 44 connecting the extra shaft 40 to the output shaft 41.

The clutch devices 24, 26 have the characteristic of being able alternately to engage and disengage the input shafts $a_1$, $a_2$ without torque interrupt. When the synchronising clutches 29-32, 37-39 are used to engage and disengage the primary spur gears I-VIII, a torque interrupt is required in order to synchronise the speed of the components concerned. When the ring gear 43 is used to switch the range gearbox 22 between the low transmission ratio position $L_R$ and the high transmission ratio position $H_R$, the speed of the ring gear 43 has to be synchronised, which likewise requires a torque interrupt. Gear change operations with the ring gear 43 in the range gearbox 22 usually require a longer torque interrupt than gear change operations with the synchronising clutches 29-32, 37-39 in the dual-clutch gearbox 21.

FIG. 2 is a table of the gearbox arrangement's gears 1-20, R1-R4 and their torque-transmitting paths. At the stage when a vehicle is being set in motion, it is usually desired to initially engage gear 1. The desired gear is indicated by the driver by means of a gear change control in the vehicle's cab. Alternatively this may be done by an automatic arrangement, in which case the first synchronising clutch 29 is moved to a position in which it connects the first input shaft $a_1$ to the first countershaft $s_1$ by means of primary spur gear I. At the same time, the fifth synchronising clutch 37 is moved to a position in which it connects the first countershaft $s_1$ to the mainshaft 36 by means of tertiary spur gear $L_1$. Finally, the ring gear 43 is moved to the low transmission ratio position $L_R$ so that the range gearbox 22 provides a low transmission ratio. After this has been done, the first clutch device 24 connects the engine's driveshaft to the first input shaft $a_1$. A torque-transmitting path which corresponds to gear 1 is thus established through the gearbox arrangement. When gear 1 is engaged, the output shaft 41 effects a downshift of the engine's speed by a suitable factor.

Thereafter it is usually desired to engage gear 2. When this is initiated by the driver or by an automatic arrangement, the second synchronising clutch 30 is moved to a position in which it connects the second input shaft $a_2$ to the first countershaft $s_1$ by means of primary spur gear II. This takes place while gear 1 is still engaged. When this connection has been established, the clutch devices 24, 26 are activated so that the first input shaft $a_1$ is disengaged while at the same time the second input shaft $a_2$ is engaged and is therefore connected to the engine's driveshaft. As the clutch devices 24, 26 are used to change from gear 1 to gear 2, the change can take place without torque interrupt. Subsequent engagement of gears 3 and 4 is effected by the synchronising clutches 29, 30 successively activating primary spur gears III and IV. As the input shafts $a_1$, $a_2$ are used alternately, another spur gear can be engaged while the previous spur gear is still engaged. The clutch devices 24, 26 are used thereafter for the gear change so that it can take place without torque interrupt. A torque-transmitting path which comprises the first countershaft $S_1$, tertiary spur gear $L_1$ and the low transmission ratio position $L_R$ of the range gearbox 22 is used for all of gears 1-4.

When gear 5 is to be engaged, the synchronising clutch 31 is moved to a position in which it connects the first input shaft $a_1$ to the second countershaft $s_2$ by means of primary spur gear V. At the same time, the synchronising clutch 38 is moved to a position in which it connects the second countershaft $s_2$ to the mainshaft 36 by means of tertiary spur gear $L_2$. This is done while gear 4 is still engaged. The torque-transmitting path for gear 4 uses the second input shaft $a_2$, whereas the torque-transmitting path for gear 5 uses the first input shaft $a_1$.

Here again it is likewise possible to use the clutch devices 24, 26 to effect the change between gears 4 and 5. A gear change without torque interrupt is thus likewise achieved. Thereafter a stepped upshift from gear 5 to gear 8 can take place in a similar way to the upshift from gear 1 to gear 4 except that in the gear range 5-8 the second countershaft $s_2$ is used instead of the first countershaft $s_1$.

In the gear range 1-8, the ring gear 43 is all the time in the low transmission ratio position $L_R$ in the range gearbox 22. When gear changes take place within the gear range 1-8, the gearbox arrangement works like a dual-clutch gearbox with eight gears, so gear changes within the gear range 1-8 can be effected without torque interrupt. Problems arise when the eight gears of the dual-clutch gearbox 21 are to be given a high transmission ratio in the range gearbox 22. The ring gear 43 then has to be moved to the high transmission ratio position $H_R$ in the range gearbox 22. This has to be preceded by the ring gear 43 being accelerated from being motionless to a speed at which it can be connected to the clutch cone of the mainshaft 36. To avoid a torque interrupt when changing from gear 8 to gear 9, the synchronising clutch 39 is moved to the position in which it connects the first countershaft $s_1$ to the extra shaft 40 by means of secondary spur gear $H_1$. The first countershaft $s_1$ is thus connected to the output shaft 41 via secondary spur gear $H_1$, the extra shaft 40 and the connecting element 44. This can be done when gear 8 is engaged, gear 8 using the second countershaft $s_2$ and the mainshaft 36. At the same time, the synchronising clutch 29 is moved to a position in which it connects the first countershaft $s_1$ to the first input shaft $a_1$ by means of primary spur gear I. When this has been achieved, the clutch devices 24, 26 can be used to effect the change between gears 8 and 9. The change between gear 8 and gear 9 can thus likewise effected without torque interrupt. Further stepped upshifts within the gear range 9-12 are effected by primary spur gears I-IV alternately connecting the first countershaft $s_1$ to the first input shaft $a_1$ and the second input shaft $a_2$.

When gear changes are effected within the gear range 9-12, the range gearbox 22 is not used and there is therefore no load upon the ring gear 43. There is therefore plenty of time to move the ring gear 43 to the high transmission ratio position $H_R$ in the range gearbox 22. When a change takes place from gear 12 to gear 13, the ring gear 43 has therefore already been moved to the high transmission ratio position $H_R$. The synchronising clutch 38 has also been moved to the position in which it connects the second countershaft $s_2$ to the mainshaft 36 by means of tertiary spur gear $H_2$. When this has been achieved, the change to gear 13 is effected by the clutch devices 24, 26 disengaging the second input shaft $a_2$ and engaging the first input shaft $a_1$. Thus a gear change without torque interrupt can likewise be effected between gears 12 and 13. Any further upward change within the gear range 13-20 is effected with the ring gear 43 in the high transmission ratio position $H_R$ in the range gearbox 22. When gear changes take place within this gear range 13-20, the gearbox arrangement works like a dual-clutch gearbox with eight gears, so gear changes within the gear range 13-20 can likewise be effected without torque interrupt. It may be noted here that when the highest gears 17-20 are used, which involves engagement of spur gear $H_3$, the second countershaft $s_2$ can be disengaged by putting the synchronising clutches 31, 32, 37, 38 into a neutral state. Such disengagement of the second countershaft $s_2$ stops inter alia tertiary spur gear R which would otherwise cause relatively large losses by rotating in an opposite direction to the mainshaft 36. The disengagement of the second countershaft $s_2$ may be done at any desired time when any of the highest gears 17-20 is used.

It may be noted that four gears R1-R4 are available for reversing the vehicle. In this case the input shafts $a_1$, $a_2$ are alternately connectable to the second countershaft $s_2$ by means of the four spur gears V-VIII. The second countershaft $s_2$ is, in this case, connected to the mainshaft 36 by means of tertiary spur gear R. During reversing, the range gearbox 22 is constantly in the low transmission ratio position $L_R$, so no torque interrupt occurs when the reverse gears R1-R4 are shifted. In this case it is therefore tertiary spur gear R which results in reversing of the vehicle and spur gear $L_1$ which results in forward movement with the lowest gears 1-4 and the reverse gears R1-R4 having respective torque-transmitting paths including different countershafts $s_1$ and $s_2$. The clutch devices 24, 26 can therefore be used to switch between driving the vehicle forwards and reversing. This function is usable in situations where the vehicle becomes stuck and needs to be "rocked" free.

In this embodiment example, the eight primary spur gears I-VIII of the dual-clutch gearbox 21 are connectable to the range gearbox 22 when it is in the low transmission ratio position $L_R$ and in the high transmission ratio position $H_R$. The primary spur gears I-VIII in the dual-clutch gearbox 21 are so dimensioned that all of the gears 13-20 which are reached with a high transmission ratio in the range gearbox 22 have a higher transmission ratio than all of the gears 1-8 which are reached with a low transmission ratio in the range gearbox 22. The ring gear 43 in the range gearbox 22 therefore need only be shifted in an intermediate gear range 9-12. The fact that the intermediate gear range 9-12 comprises four gears means that there is plenty of time to shift the range gearbox 22 between the low transmission ratio position $L_R$ and the high transmission ratio position $H_R$.

The invention is not limited to the embodiment described above but may be varied freely within the scopes of the claims. The synchronising clutches 29-33, 37-39 depicted in FIG. 1 are of conventional kind, but it is possible to use disc brakes instead of the conventional synchronising clutches for synchronising and connecting together the spur gears on the various shafts. In the above embodiment example, the gearbox arrangement has twenty gears for driving forwards and four gears for reversing. The numbers of gears may of course be both greater and smaller.

The invention claimed is:

1. A gearbox arrangement comprising a first gearbox, an adjoining range gearbox, and a connecting element included in the range gearbox, wherein the first gearbox comprises:

at least one input shaft, and at least one countershaft, each of the at least one input shaft and the at least one countershaft having at least two primary gearwheels, respectively, wherein one of the primary gearwheels on the input shaft and one of the primary gearwheels on the at least one countershaft are configured to operate together to provide a transmission ratio for a speed of the input shaft, at least one first motion-transmitting connection including one of the primary gearwheels on the at least one countershaft, the at least one first motion-transmitting connection being configured to connect one of the at least two primary gearwheels on the at least one input shaft to the range gearbox and to transmit rotary motion from the one of the at least two primary gearwheels on the at least one input shaft to the range gearbox, the range gearbox being configured to convert the transmission ratio to a low transmission ratio or a high transmission ratio before the rotary motion is led to an output shaft, each of the at least two primary gearwheels on the at least one input shaft connected to the range gearbox being configured to operate in a first gear, the first gear providing the low transmission ratio before the rotary motion is led to the output shaft, and each of the at least two primary gearwheels on the at least one input shaft connected to the range gearbox being configured to operate in a second gear, the second gear providing the high transmission ratio before the rotary motion is led to the output shaft, and at least one second motion-transmitting connection comprising one of the primary gearwheels on the at least one countershaft, of the at least one countershaft, a first secondary gearwheel on of the at least one countershaft, a second secondary gearwheel on an extra shaft, the extra shaft, and the connecting element which is continuously and rigidly connected to: (1) the extra shaft and (2) the output shaft, and being configured to connect one of the at least two primary gearwheels on the at least one input shaft to the output shaft and to transmit rotary motion from the one of the at least two primary gearwheels on the at least one input shaft through the at least one countershaft, the first secondary gearwheel on the at least one countershaft, the second secondary gearwheel on the extra shaft, the extra shaft, and the connecting element to the output shaft, the gearbox arrangement being configured to allow each of the at least two primary gearwheels on the at least one input shaft, which are connected to the output shaft, to operate in at least one extra gear, in addition to the first gear and the second gear, wherein the first gearbox is configured to transmit rotary motion through the at least one second motion-transmitting connection, each of the at least two primary gearwheels on the at least one input shaft, which are connected to the output shaft, being so dimensioned that: the at least one extra gear has a higher transmission ratio than the low transmission ratio of the first gear, and the at least one extra gear has a lower transmission ratio than the high transmission ratio of the second gear.

2. The gearbox arrangement according to claim 1, wherein the at least two primary gearwheels on the at least one input shaft, which are connected to the range gearbox, are dimensioned such that the first gear, in which the at least two primary gearwheels on the at least one input shaft operate and which provides the low transmission ratio, has a lower transmission ratio than the second gear, in which the at least two primary gearwheels on the at least one input shaft operate and which provides the high transmission ratio.

3. The gearbox arrangement according to claim 1, wherein the range gearbox comprises a planetary gear with a clutch element which is movable between a low transmission ratio position and a high transmission ratio position.

4. The gearbox arrangement according to claim 1, wherein the first gearbox is a dual-clutch gearbox.

5. The gearbox arrangement according to claim 4, wherein the at least one input shaft comprises a first input shaft, which is engageable and disengageable by a first clutch device, and the first gearbox further comprises a second input shaft, which is engageable and disengageable by a second clutch device.

6. The gearbox arrangement according to claim 5, wherein the first gear and the second gear are adjacent gears and the gearbox arrangement is so configured that a stepped gear change between the first gear and the second gear causes the first clutch device and the second clutch device to effect alternating engagement of the first input shaft and the second input shaft.

7. The gearbox arrangement according to claim 6, wherein the at least one countershaft comprises a first countershaft and the first gearbox further comprises a second countershaft, and the at least two primary gearwheels on each of the at least one input shaft and the at least one countershaft comprise:
 at least one first primary gearwheel on the first input shaft,
 at least one first primary gearwheel on the first countershaft,
 at least one second primary gearwheel on the first input shaft,
 at least one second primary gearwheel on the second countershaft,
 at least one third primary gearwheel on the second input shaft,
 at least one third primary gearwheel on the first countershaft,
 at least one fourth primary gearwheel on the second input shaft, and
 at least one fourth primary gearwheel on the second countershaft,
wherein:
 the at least one first primary gearwheel on the first input shaft and the at least one first primary gearwheel on the first countershaft connect the first input shaft to the first countershaft,
 the at least one second primary gearwheel on the first input shaft and the at least one second primary gearwheel on the second countershaft connect the first input shaft to the second countershaft,
 the at least one third primary gearwheel on the second input shaft and the at least one third primary gearwheel on the first countershaft connect the second input shaft to the first countershaft, and
 the at least one fourth primary gearwheel on the second input shaft and the at least one fourth primary gearwheel on the second countershaft connect the second input shaft to the second countershaft.

8. The gearbox arrangement according to claim 7, wherein the at least one first motion-transmitting connection comprises a mainshaft connected to the range gearbox, such that the first countershaft is connectable to the mainshaft by at least one first tertiary gearwheel on the first countershaft and at least one first tertiary gearwheel on the mainshaft and the second countershaft is connectable to the mainshaft by at least one second tertiary gearwheel on the second countershaft and at least one second tertiary gearwheel on the mainshaft.

9. The gearbox arrangement according to claim 5, wherein the at least one countershaft comprises a first countershaft and the first gearbox further comprises a second countershaft, and the at least two primary gearwheels on each of the at least one input shaft and the at least one countershaft comprise:
 at least one first primary gearwheel on the first input shaft,
 at least one first primary gearwheel on the first countershaft,
 at least one second primary gearwheel on the first input shaft,
 at least one second primary gearwheel on the second countershaft,
 at least one third primary gearwheel on the second input shaft,
 at least one third primary gearwheel on the first countershaft,
 at least one fourth primary gearwheel on the second input shaft, and
 at least one fourth primary gearwheel on the second countershaft, wherein:
the at least one first primary gearwheel on the first input shaft and the at least one first primary gearwheel on the first countershaft connect the first input shaft to the first countershaft,
the at least one second primary gearwheel on the first input shaft and the at least one second primary gearwheel on the second countershaft connect the first input shaft to the second countershaft,
the at least one third primary gearwheel on the second input shaft and the at least one third primary gearwheel on the first countershaft connect the second input shaft to the first countershaft, and
the at least one fourth primary gearwheel on the second input shaft and the at least one fourth primary gearwheel on the second countershaft connect the second input shaft to the second countershaft.

10. The gearbox arrangement according to claim 9, wherein the at least one first motion-transmitting connection comprises a mainshaft connected to the range gearbox, such that the first countershaft is connectable to the mainshaft by at least one first tertiary gearwheel on the first countershaft and at least one first tertiary gearwheel on the mainshaft and the second countershaft is connectable to the mainshaft by at least one second tertiary gearwheel on the second countershaft and at least one second tertiary gearwheel on the mainshaft.

11. The gearbox arrangement according to claim 1, wherein the extra shaft is rigidly connected with the output shaft by the connecting element so that the rotational speed of the extra shaft is the same as the rotational speed of the output shaft.

12. The gearbox arrangement according to claim 1, wherein the at least one first motion-transmitting connection comprises a mainshaft connected to the range gearbox, the mainshaft being separated from the at least one input shaft by a wall dividing the first gearbox into a first space including the at least one input shaft and a second space including the mainshaft.

* * * * *